Aug. 5, 1958 G. E. NICHOLS 2,845,732
CALENDAR MOUNT FOR CALENDAR MEMO PADS
Filed March 9, 1955 2 Sheets-Sheet 1

Inventor
Gordon E. Nichols
by Roberts, Cushman & Grover
Att'ys

Aug. 5, 1958   G. E. NICHOLS   2,845,732
CALENDAR MOUNT FOR CALENDAR MEMO PADS
Filed March 9, 1955   2 Sheets-Sheet 2
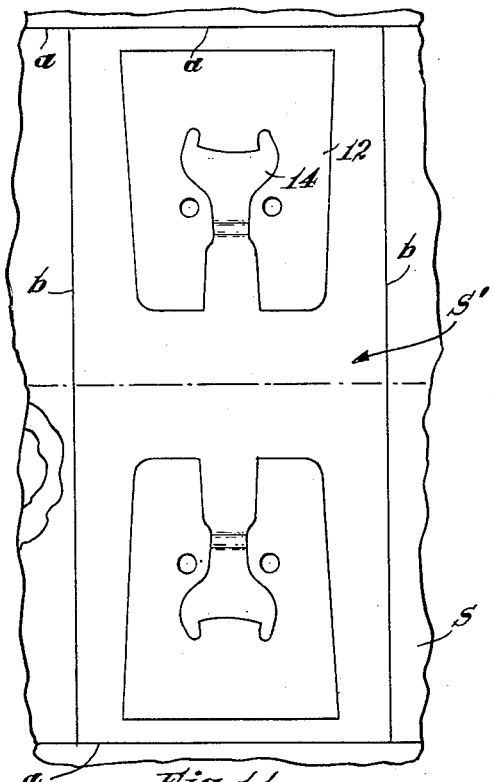
Fig. 11
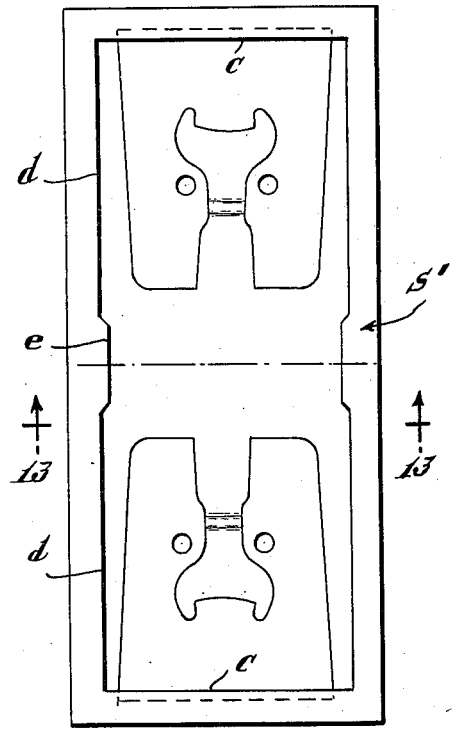
Fig. 12
Fig. 13
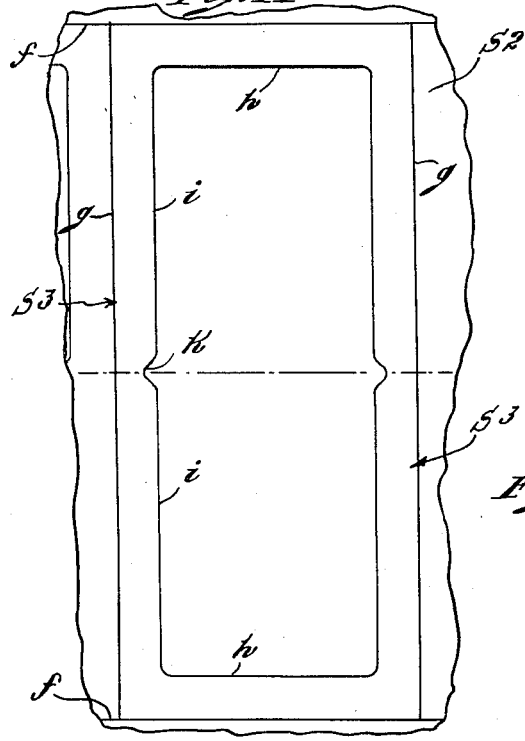
Fig. 14
Inventor
Gordon E. Nichols
by Roberts, Cushman & Grover
Att'ys

# United States Patent Office 2,845,732
Patented Aug. 5, 1958

2,845,732

CALENDAR MOUNT FOR CALENDAR MEMO PADS

Gordon E. Nichols, Middleboro, Mass., assignor to Winthrop-Atkins Co., Inc., Middleboro, Mass., a corporation of Massachusetts Application March 9, 1955, Serial No. 493,269

1 Claim. (Cl. 40—152.1)

This invention relates to an easel type mount such as is commonly used for advertising purposes and has for is principal objects to provide a mount which is adapted not only to bear a photograph and/or calendar pad but also to receive telephone listings and/or memorandum, which are normally fully concealed but may readily be exposed for reference. Other objects are to provide a mount in which the normall visible and concealed areas are substantially coextensive and arranged one behind the other thereby consolidating the useful areas in a minimum space while maintaining their respective usefulness independently of each other. Another object is to provide a mount in which the visible and concealed areas are carried by relatively movable parts normally located one behind the other but one of which may be manually displaced to expose the concealed area and when released will gravitate to its initial position. Another object is to provide a mount which is inexpensive to manufacture, durable, easy to set up and in which the parts will not easily become jammed in use or readily separable so as to become lost.

In accordance with the invention the mount has a rigid faceboard adapted to be supported in an upright, rearwardly inclined position by a leg and brace, on which is slidably mounted a panel which normally covers the major portion of the area of the front face of the faceboard but which is movable in a plane parallel to that of the faceboard to a withdrawn position to expose the major portion of the front surface of the faceboard beneath the panel. Guides are carried by the faceboard with which the panel is cooperably associated to constrain movement of the panel linearly from a position covering the faceboard upwardly therefrom. The guides are in the form of spaced grooves in the surface of the faceboard within which the lateral edges of the panel slide and both the panel and the faceboard carry interengageable parts which limit both the lowermost position and uppermost position of the panel, the latter preventing disengagement of the panel from the faceboard. The panel provides a flat surface on which a photograph and/or calendar pad may be mounted and the surface beneath the panel may be prepared to receive telephone tabulations and/or memorandum as desired.

The invention will now be described in greater detail with reference to the accompanying drawings wherein:

Fig. 11 is a plan view of a method of manufacturing mounts in pairs from a length of multiply paperboard;

Fig. 12 is a plan view of a pair of mounts severed from the length of multiply paperboard and further operated upon to provide a cavity at one side;

Fig. 13 is a section taken on the line 13—13 of Fig. 12; and

Fig. 14 is a plan view of a method of manufacturing pairs of faceboards for the pairs of mounts from a length of single-ply board.

Figure 3:
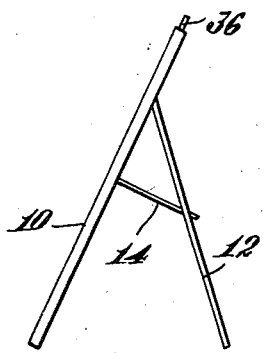
Fig. 3 shows a side view of the mount set up with the front and leg held angularly spaced by a brace.

Referring to the drawings the mount has a faceboard 10, a leg 12 hinged at 16 to the backside thereof and a brace 14 also hinged to the backside at 18 which has spaced fingers 20—20 interengageable with the spaced apertures 22—22 in the leg for holding the faceboard and leg spread apart as shown in Fig. 3.

Figure 1:
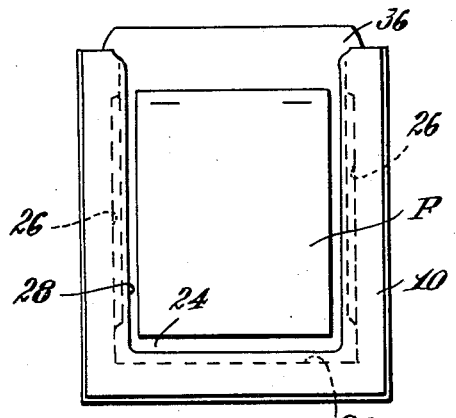
Fig. 1 is a front view of the mount as seen from a point perpendicular to its surface.
Figure 2:
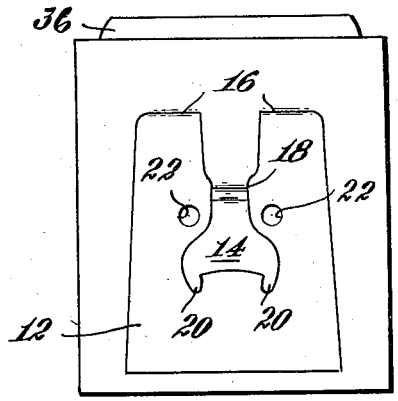
Fig. 2 is a rear view of the mount as seen from a point perpendicular to its surface with the leg and brace collapsed.
Figure 4:
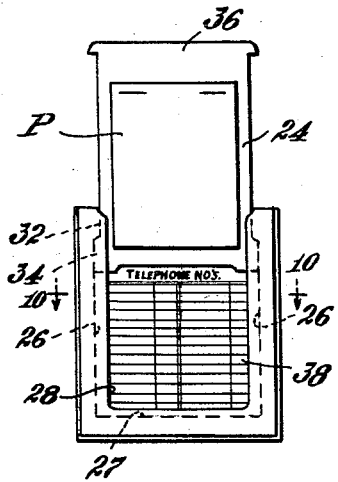
Fig. 4 is a front view of the mount viewed perpendicular to its surface with the panel withdrawn.

A rigid panel 24 of rectangular shape is slidably mounted on the front face of the faceboard for movement in a plane parallel thereto along guides 26—26 which constrain its movement linearly from a position covering the major portion of the surface of the faceboard as shown in Fig. 1, to a withdrawn position exposing the major portion of the faceboard as shown in Fig. 4. The guides 26—26 are in the form of grooves underlying the marginal edges of a substantially rectangular opening 28 in the surface of the faceboard within which the lateral edges of the panel are slidably engaged. The correspondingly formed groove 27 along the bottom of the opening provides a shoulder against which the lower edge of the panel rests when the latter is contained within the opening thus limiting the lowermost position of the panel. Shoulders 32 and 34 carried respectively by the faceboard and the lower end of the panel cooperate to limit withdrawal of the panel so that it cannot accidentally be disengaged from the faceboard. A tab 36 at the upper end of the panel provides convenient means for manipulating the panel either to withdraw it or restore it to its initial position. Ordinarily, however, the panel will drop down to its initial position once it is released solely by its own weight so that it need not be forced back into position. Within the opening 28 behind the panel 24 there is mounted a card 38 divided into horizontal spaced, parallel areas, for example, to receive a listing of telephone numbers, although it is to be understood that other information may be placed thereon or that the card may be left blank for the purpose of receiving memorandum. In place of a single card 38 a thin memorandum pad having a plurality of leaves may be placed behind the panel. The panel is adapted to have mounted thereon a photograph and/or calendar pad P which may be, for example, stapled thereto and in its normal position will conceal the card 38 beneath it. When desired the panel may be withdrawn to expose the card beneath it to make a notation of a telephone number or to refer to one already on the card.

Figure 5:
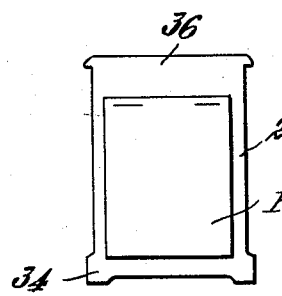
Fig. 5 is a plan view of the panel.
Figure 6:
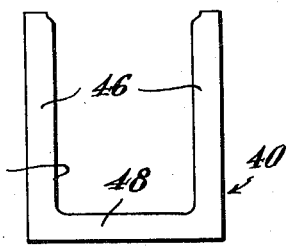
Fig. 6 is a plan view of the front ply of the faceboard.
Figure 7:
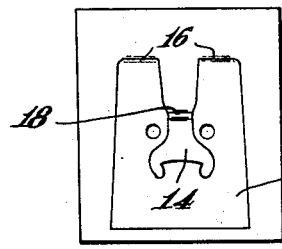
Fig. 7 is a plan view of the rear ply of the faceboard.
Figure 8:
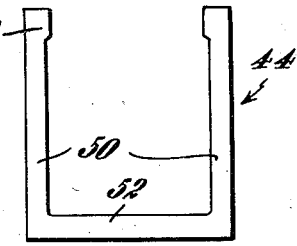
Fig. 8 is a plan view of one of two spacers of the same shape and size used between the front and rear plies.
Figure 9:
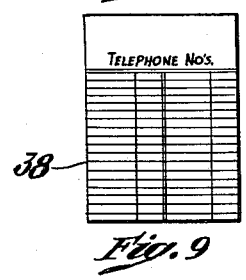
Fig. 9 is a plan view of the tabulating sheet.
Figure 10:
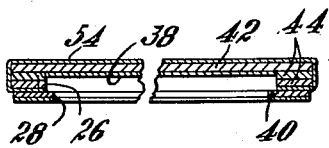
Fig. 10 is a transverse section taken on the line 10—10 of Fig. 4.

The mount is comprised of several plies of board fastened together by a decorative paper. Specifically there is a front ply 40, a rear ply 42, one or more intermediate plies 44 and the card 38. The front ply 40 (Fig. 6) is made of a rigid, rectangular piece of paperboard and has spaced parallel legs 46—46 joined at one end by a cross piece 48 and unjoined at their opposite ends so as to define the opening 28. The rear ply 42 (Fig. 7) is suitably cut, as for example in my Patent No. 2,471,536, to provide the leg 12 and brace 14. The intermediate ply (Fig. 8) of which two are used herein correspond substantially to the front ply having spaced legs 50—50 and a cross piece 52; however, both the legs and the cross piece are narrower than the corresponding legs and cross piece of the faceboard. The upper ends of the legs 50—50 are made wider at their inner sides to provide for the shoulders 32—32. The card 38 (Fig. 9) is of rectangular shape, corresponds substantially in dimensions to the opening defined by the leg 50—50 of the spacer and has marked on its surface a number of spaced parallel lines defining areas within which telephone numbers or other indicia may be placed. The panel 24 (Fig. 5) is a flat, substantially rectangular board having at its bottom corners outwardly extending projections which provide the shoulders 34—34 and along its top narrower extensions, the outer ends of which project beyond the margin of the board and provide shoulders which rest against the upper ends of the spacers.

The parts of the mount may be individually cut out of paperboard and assembled by placing two of the spacers 44 against one side of the rear ply 42 prior to making the cuts necessary to form the leg and brace, then fastening the card 38 within the space defined by the legs 50—50 against the rear ply and then wrapping the rear ply and spacers with a paper ply 54 which extends across the back of the rear ply forwardly around the edges of the spacers and over the front face of the outermost spacer thus binding the parts together. The leg and brace may then be formed by cutting through the paper 54 and backboard. The front ply 40 may then be adhesively secured against the front spacer over the binding paper and preferably itself has a decorative paper of like or contrasting color applied to its exposed surface. Since the legs 50—50 of the spacers are narrower than the legs 46—46 of the front ply re-entrant grooves are formed beneath the front ply when it is fastened against the front spacer within which the lateral edges of the panel 24 are slidable. Normally the panel when inserted in the grooves rests with its lower edge resting on the bottom of the grooves formed by the cross pieces 52 of the spacers and when it is withdrawn to uncover the card 38 the lateral shoulders 34—34 are brought up against the inwardly directed shoulders 32—32 thus preventing disengagement of the panel. In assembly the panel may be laid against the surface of the card 38 before the front ply is attached if desired, so that the shoulders 34—34 lie within the grooves below the shoulders 32—32, or if desired the panel may be slipped into the grooves after the front ply is attached by forcing the plies apart sufficiently to admit the shoulders but without breaking the board or destroying the binding.

Preferably, pairs of mounts are made at the same time to minimize the assembly operations and effect economy in manufacturing costs as shown in Figs. 11 to 14 inclusive. As there illustrated (Fig. 11) three layers of paperboard $s$ are laid one upon another and advanced by suitable feeding means across a table beneath cutting means which includes one or more pairs of dies arranged side by side to cut through the three plies along lines $a$—$a$ and $b$—$b$ and through the uppermost ply only along lines necessary to form the leg and brace parts 12 and 14. Each three-ply section $s1$ of which there may be several arranged side by side depending upon the width of the paperboard constitutes two integrally joined mounts arranged top to top. The double mount sections $s1$ are now turned over and operated upon by suitably shaped cutting dies to cut through the face ply turned uppermost and the middle ply (Fig. 12) along lines $c$—$c$ and *ded*—*ded* thereby to form a substantially rectangular cavity defined by the lines $c$—$c$ and *ded*—*ded*. Each double section is then wrapped with facing paper (Fig. 13) to bind the plies together. A single layer of paperboard $s2$ (Fig. 14) is now operated upon by cutting along lines $f$—$f$, $g$—$g$, $h$—$h$ and $iKi$—$iKi$ to form a double frame or facing ply $s3$. The double facing ply $s3$ is now fastened to the double section $s'$ whereupon the composite double unit is cut transversely midway between its ends to separate it into two mounts. The card 38 and the panel P for use with each mount are made as previously mentioned.

As thus constructed it is apparent that a very useful, decorative, sturdy article is provided which serves not only to display a photograph and/or a calendar pad but has further utility in that it is adapted to receive telephone numbers or other listed indicia normally concealed but readily available for use.

It should be understood that the present disclosure is for the purpose of illustration only and that this invention includes all modifications and equivalents which fall within the scope of the appended claim.

I claim:

In combination, a memorandum pad consisting of a plurality of sheets of writing paper fastened together at one end and free to be lifted one away from the next at the other end, and means for supporting the pad in an upright rearwardly inclined position at an angle convenient for jotting down memoranda thereon, said support comprising a rigid panel to which the pad is fastened and a rigid frame containing a pocket defined by a back wall against which the panel rests, a front wall having an open unobstructed window therein of narrower width than the panel but of greater width than the pad, the margins of the front wall bounding the window overlying the margins of the panel and holding the same in the pocket with the pad projecting forwardly through the window so that the front sheet is exposed for writing on it, a bottom wall upon which the lower edge of the panel rests when inserted in the pocket, and a top side having an opening in it which corresponds substantially in width to the width of the panel through which the panel may be slid upwardly, partially to withdraw it from the pocket to expose the underlying forward face of the back wall of the pocket, said back wall of the pocket being adapted to bear indicia, means connected to the rear side of the back wall for holding the frame in an upright rearwardly inclined position, and means on the upper end of the panel projecting upwardly through the opening at the top of the pocket when the lower edge of the panel is engaged with the bottom wall of the pocket, said means constituting a pull tab for pulling the panel upwardly within the pocket.

References Cited in the file of this patent

UNITED STATES PATENTS

| | | |
|---|---|---|
| 547,377 | Gillbee | Oct. 1, 1895 |
| 567,012 | Strong | Sept. 1, 1896 |
| 577,676 | Bartoszewicz | Feb. 23, 1897 |
| 617,832 | Kling | Jan. 17, 1899 |
| 854,971 | Thomas | May 28, 1907 |
| 1,779,069 | Lane | Oct. 21, 1930 |
| 1,888,564 | O'Rourke | Nov. 22, 1932 |
| 2,177,405 | Gross | Oct. 24, 1939 |
| 2,373,874 | Cross | Apr. 7, 1945 |
| 2,570,397 | Slonneger | Oct. 9, 1951 |

FOREIGN PATENTS

| | | |
|---|---|---|
| 4,423 | Great Britain | Feb. 14, 1907 |
| 398,291 | France | June 1, 1909 |
| 572,705 | France | Feb. 27, 1924 |